United States Patent
Becker

(10) Patent No.: US 11,731,534 B2
(45) Date of Patent: Aug. 22, 2023

(54) ACTUATING DRIVE FOR A MOTOR VEHICLE, COMPRISING AN ELECTRONIC MOTOR, A TRANSMISSION, AND A SPINDLE

(71) Applicant: Fisher Dynamics Germany GmbH, Wuppertal (DE)

(72) Inventor: Hans Burckhard Becker, Solingen (DE)

(73) Assignee: FISHER DYNAMICS GERMANY GMBH, Wuppertal (DE)

( * ) Notice: Subject to any disclaimer, the term of this patent is extended or adjusted under 35 U.S.C. 154(b) by 202 days.

(21) Appl. No.: 17/048,939

(22) PCT Filed: Mar. 8, 2019

(86) PCT No.: PCT/EP2019/055860
§ 371 (c)(1),
(2) Date: Oct. 19, 2020

(87) PCT Pub. No.: WO2019/201509
PCT Pub. Date: Oct. 24, 2019

(65) Prior Publication Data
US 2021/0114486 A1    Apr. 22, 2021

(30) Foreign Application Priority Data

Apr. 19, 2018    (DE) ..................... 10 2018 109 351.9

(51) Int. Cl.
*B60N 2/00*    (2006.01)
*B60N 2/02*    (2006.01)
(Continued)

(52) U.S. Cl.
CPC .......... *B60N 2/0232* (2013.01); *B60N 2/929* (2018.02); *F16H 1/16* (2013.01);
(Continued)

(58) Field of Classification Search
CPC .................. B60N 2/0232; B60N 2/929; B60N 2002/0236; F16H 1/16; F16H 2025/2031;
(Continued)

(56) References Cited

U.S. PATENT DOCUMENTS 3,532,322 A    10/1970 Webster et al.
3,617,021 A *  11/1971 Littmann ............... B60N 2/067
                                              74/89.36

(Continued)

FOREIGN PATENT DOCUMENTS

CN            1494496 A      5/2004
CN         101277845 A     10/2008
(Continued)

OTHER PUBLICATIONS

International Search Report for Application No. PCT/EP2019/055860, dated Mar. 19, 2020, 4 pages.

*Primary Examiner* — Victor L Macarthur
(74) *Attorney, Agent, or Firm* — McCarter & English, LLP

(57) ABSTRACT

Actuating drive having: a transmission including a housing, a transmission gear engaging a driveshaft, a bearing, and a spindle rotatable about a rotational axis and extending through an inner thread of the transmission gear and outlets of the housing. The housing has a cylindrical bore receiving the bearing and defining a cylinder axis. The bearing is delimited by a three-dimensional area, the largest cross-sectional area of which is circular and, when viewed in the direction of the cylinder axis, perpendicular to the cylinder axis in the intersection of the cylinder axis and the rotational axis. The cross-sectional area decreases with increasing distance from the intersection in both directions of the cylinder axis. The bearing has two bearing shells, each having a bearing opening centered relative to the rotational (Continued)

axis, which the spindle passes through, and in which the transmission gear is rotatably mounted.

18 Claims, 6 Drawing Sheets

(51) Int. Cl.
*B60N 2/90* (2018.01)
*F16H 1/16* (2006.01)
*F16H 25/20* (2006.01)

(52) U.S. Cl.
CPC ............ *B60N 2002/0236* (2013.01); *F16H 2025/209* (2013.01); *F16H 2025/2031* (2013.01)

(58) Field of Classification Search
CPC ....... F16H 2025/209; F16H 2025/2084; F16H 2025/2445; F16H 25/22; F16H 25/24
See application file for complete search history.

(56) References Cited

U.S. PATENT DOCUMENTS

| | | | | |
|---|---|---|---|---|
| 4,286,841 | A | * | 9/1981 | Deshaw ............... B60R 1/072 359/876 |
| 8,820,694 | B2 | * | 9/2014 | Tarusawa ............. B60N 2/067 296/65.13 |
| 2007/0290117 | A1 | * | 12/2007 | Hetrick ................ B60R 1/072 248/495 |
| 2008/0163708 | A1 | * | 7/2008 | Porinsky ............. F16H 25/2021 74/425 |
| 2015/0360587 | A1 | * | 12/2015 | Hoffmann ........... B60N 2/0232 74/89.14 |

FOREIGN PATENT DOCUMENTS

| | | |
|---|---|---|
| DE | 102006005499 A1 | 11/2006 |
| EP | 0018274 A1 | 10/1980 |
| EP | 1645458 A1 | 4/2006 |
| GB | 2300971 A | 11/1996 |
| JP | 2012-016217 A | 1/2012 |
| JP | 2012-251601 A | 12/2012 |
| WO | 8606036 A1 | 10/1986 |
| WO | 9951456 A1 | 10/1999 |
| WO | 0160656 A1 | 8/2001 |
| WO | 03068551 A1 | 8/2003 |
| WO | 2006/027066 A1 | 3/2006 |
| WO | 2015/113929 A1 | 8/2015 |
| WO | 2017/010028 A1 | 1/2017 |
| WO | 2018019609 A1 | 2/2018 |

\* cited by examiner

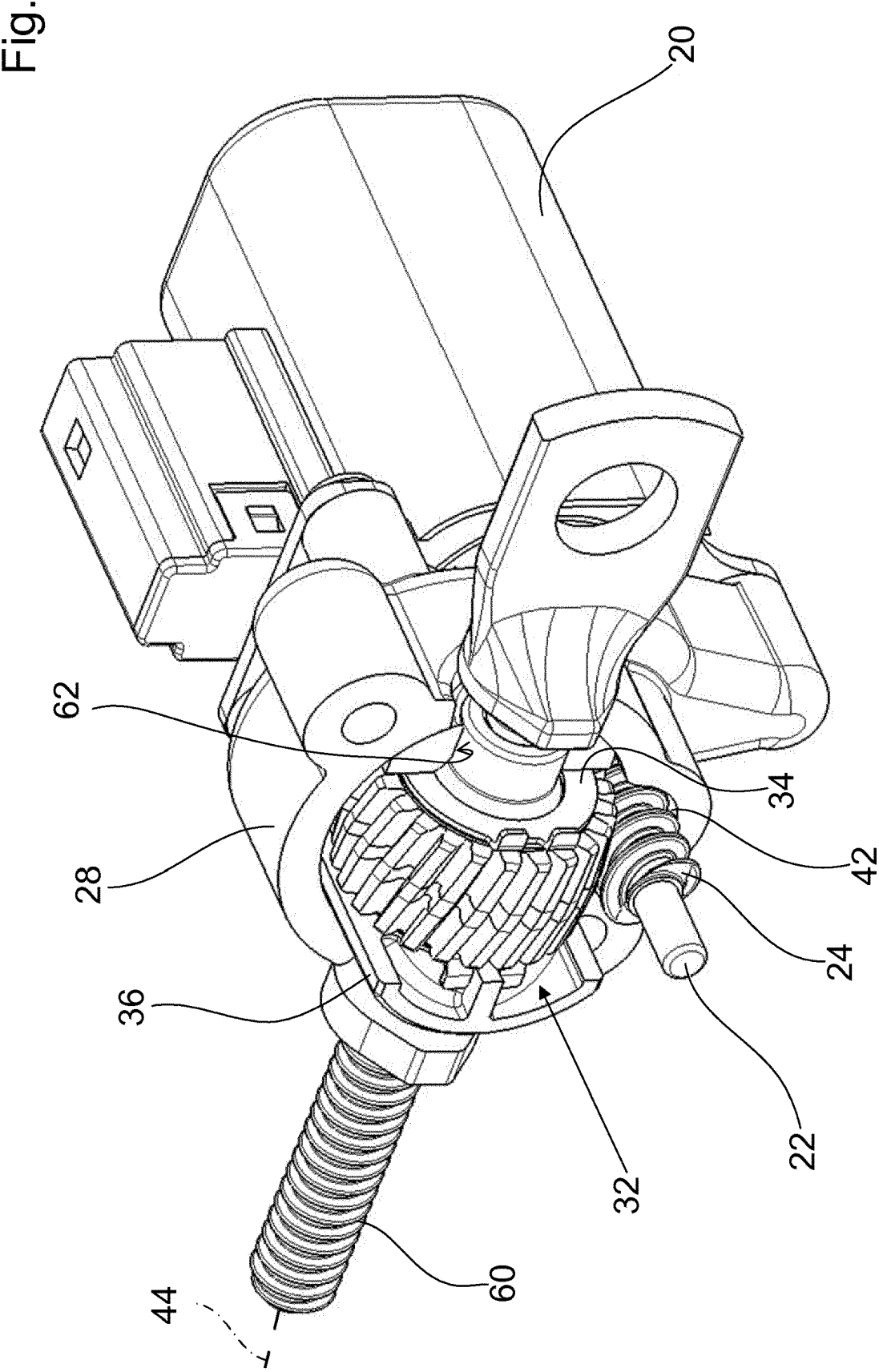

ACTUATING DRIVE FOR A MOTOR VEHICLE, COMPRISING AN ELECTRONIC MOTOR, A TRANSMISSION, AND A SPINDLE

CROSS-REFERENCE TO RELATED APPLICATIONS

This application is a national stage application of international application no. PCT/EP2019/055860 filed Mar. 8, 2019, entitled "Actuating Drive for a Motor Vehicle. Comprising an Electric Motor, a Transmission, and a Spindle," claiming priority to German application no. DE 10 2018 109 351.9 filed Apr. 19, 2018, which are hereby expressly incorporated by reference as part of the present disclosure.

FIELD OF THE DISCLOSURE

The present disclosure relates to an actuating drive, e.g., for a motor vehicle, such as for adjusting a motor vehicle seat; the actuating drive has an electric motor, a transmission and a spindle. In at least some embodiments, the electric motor drives a drive shaft on which a worm is located. The latter is in engagement with the transmission gear, which is arranged in the housing and is accommodated rotatably in the bearing part. The bearing part is located between the transmission gear and the housing. The spindle has a spindle axis extending parallel to the rotational axis, is in engagement with a continuous internal thread of the transmission gear and extends through outlets of the housing.

BACKGROUND

Such spindle drives are known, for example, from WO 86/06036 A1, WO 99/51456 A1, WO 01/60656 A1, WO 03/068551 A1, DE 10 2006 005 499 A1 and EP 1 645 458 A1. They are used for adjusting two parts that are adjustable relative to each other, for example two parts connected to each other via articulation. During an adjustment movement, a precise, geometrically constant adjustment path is usually not present in each individual case. It is therefore not possible to connect the electric motor with one of the two parts to be adjusted and the spindle to the other, in a fixed manner or in articulation, without allowing for compensation. For example, DE 10 2006 005 499 A1 describes an outer holder and an inner transmission that can be pivoted parallel to the axis of the drive shaft within the outer holder. The drive according to WO 86/06036 A1 and WO 01/60656 A1 is designed in a similar manner. The drives according to WO 99/51456 A1 and EP 1 645 458 A1 do not provide for compensation.

WO 2018/019609 A1 describes a drive device for a comfort drive of a motor vehicle with an electric motor having a drive shaft, with a transmission arranged at the drive shaft, which interacts with a transfer element arranged in an inner housing, wherein the transfer element interacts with a drive element having a longitudinal axis, wherein the transfer element is designed to transfer a rotational movement of the transfer element to a linear movement of the drive element, wherein the inner housing is arranged in a receptacle of an outer housing and wherein the outer housing forms an interface for connecting the drive device with a carrier structure of a motor vehicle.

SUMMARY

However, it has been found that a compensation, which simply is a pivoting movement of the spindle relative to the transmission or the electric motor about an axis parallel to the axis of the drive shaft, is not sufficient. Other components must not be overlooked. Thus, it is desirable to provide a compensation in such a way that a certain pivoting movement of the spindle is possible about a pivot axis which runs both transversely to said axis and transverse to the axis of the spindle.

It is an object of the present disclosure to refine the known actuating drives of the aforementioned type in such a way that compensation is possible not only along a single axis but also along at least two axes.

Such may be achieved, for example, with an actuating drive, e.g., for a motor vehicle, such as for a vehicle seat, with an electric motor which drives a drive shaft, with a transmission having a) a housing, b) a transmission gear, the splines of which engage with the drive shaft and which has a rotational axis, and c) a bearing part located between the transmission gear and the housing, and with a spindle having a spindle axis extending parallel to the rotational axis, which spindle extends through an internal thread of the transmission gear and through outlets in the housing and is in engagement with this internal thread, wherein the housing has a cylinder bore which accommodates the bearing part and defines a cylinder axis, wherein the bearing part is confined by a three-dimensional area which, seen in the direction of the cylinder axis, has its largest cross-sectional area at the intersection of the cylinder axis with the rotational axis, wherein this largest cross-sectional area is a circular area, and wherein, with increasing distance from this intersection in both directions of the cylinder axis, the size of the cross-sectional surface decreases more and more, in particular decreases constantly, and wherein the bearing part has two bearing shells, each of which has a bearing opening which is centered to the rotational axis, which the spindle penetrates and in which the transmission gear is mounted rotatably.

In at least some embodiments, the transmission gear is located between the two bearing shells. The transmission gear and the two bearing shells form a unit that moves together. This unit is held in the cylinder bore. It can pivot about the axis of the cylinder bore. It can also pivot about at least one other axis that is orthogonal to the axis of the cylinder bore. Therein, it can pivot about the axis of the cylinder bore by a first angular range, and pivot about at least one additional axis by a second angular range. The second angular range is no more than 30%, and in some embodiments no more than 15%, of the first angular range. This allows for compensating movements about two or three orthogonal pivot axes. The compensating movements can be performed simultaneously by components about two or three of these orthogonal pivot axes. It is possible to perform compensating movements about pivot axes in any direction in the space.

The actuating drive according to at least some embodiments can thus be attached to the two parts to be adjusted relative to each other as follows: The electric motor, which may be firmly connected to the housing of the transmission, is fixed on one of the parts. On the other part, the free end of the spindle is articulated. All necessary compensating movements take place within the actuating drive. The actuating drive does not require a separate holder. The spindle may have a hole at its free end which can receive a joint pin.

The first angular range of at least some embodiments is limited only by the measurements of the outlets in the housing, as measured in the corresponding pivot direction. The first pivot angle can be up to ±15°, or in at least some embodiments up to ±10°. The second pivot angle can be in the range of ±3°, or in at least some embodiments up to ±1.5°. It is also determined by the three-dimensional area. This area determines the angular range in which the unit can position itself at an angle to the axis of the cylinder bore. As only a small angular range is required for the second pivot angle, the degree at which the cross-sectional area decreases with increasing distance from the intersection in both directions of the cylinder axis can be selected to be small. A ratio of the radius of the cylinder bore to the radius of a circular line, within which the three-dimensional area is located in a plane that extends parallel to the cylinder axis, of greater than 3 or in at least some embodiments greater than 8, is advantageous. Such a ratio results in a good support of the bearing part within the cylinder bore.

The bearing part may be formed from two bearing shells. These can be identical in design. Each bearing opening may be located below respective outlets of the housing. The transmission gear may have stub shafts, which protrude on both sides and protrude into the bearing openings. Between these stub shafts and bearing openings, support means may be provided, which ensure that the transmission gear rotates in the bearing shells with as little friction as possible. Two bearing shells, the transmission gear positioned in between them, and the respective support means can thus form a pre-assembled unit, which is inserted into the cylinder bore.

In at least some embodiments, the three-dimensional surface is not a spherical surface. The drive shaft may have a worm, which works together with a worm wheel of the transmission gear. The worm wheel may be formed as a spherical gear. This means that it remains engaged more effectively with the worm during a compensating movement about the first pivot angle than would a gear with flanks extending parallel to the rotational axis. However, in other embodiments the worm wheel teeth end in a straight line, such as for in a smaller range of the first pivot angle and/or at sufficient depth of the engagement of the splines.

In at least some embodiments, the housing has a body that forms the cylinder bore, and a cap. Therein, the cap only closes off the body to the outside and is essentially flat. The housing may be rigidly connected to the electric motor.

In at least some embodiments, the three-dimensional area is formed by a spheroid, which has a generating ellipse, which has a large half-axis that coincides with a rotational axis of the generating ellipse, and has a small half-axis, the length of which is i) adapted to the radius of the cylinder bore, and ii) is no more than 20% of the length of the large half-axis. A compensation of 3° in the second angular range is achieved when the large half-axis of the spheroid is positioned with a deviation of 3° to the cylinder axis.

In at least some embodiments, the outlets of the housing are slotted holes, which have a large inner clearance, which extend peripherally about the cylinder axis and thus in the direction of the first angular range, and have a small inner clearance, which extend parallel to the cylinder axis. Due to the dimensions and thus the shape of the outlets, the angular range in which compensating movements can take place can be limited.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Further advantages and features follow from the remaining claims as well as the following description of two exemplary embodiments, which should not be considered to be restricting and which are explained in more detail below with reference to the drawings. The drawings show:

FIG. 7 shows a perspective sectional view of an assembled arrangement according to FIG. 4; wherein the sectional plane lies essentially in the plane formed by the rotational axis and the third axis.

DETAILED DESCRIPTION

Figure 1:
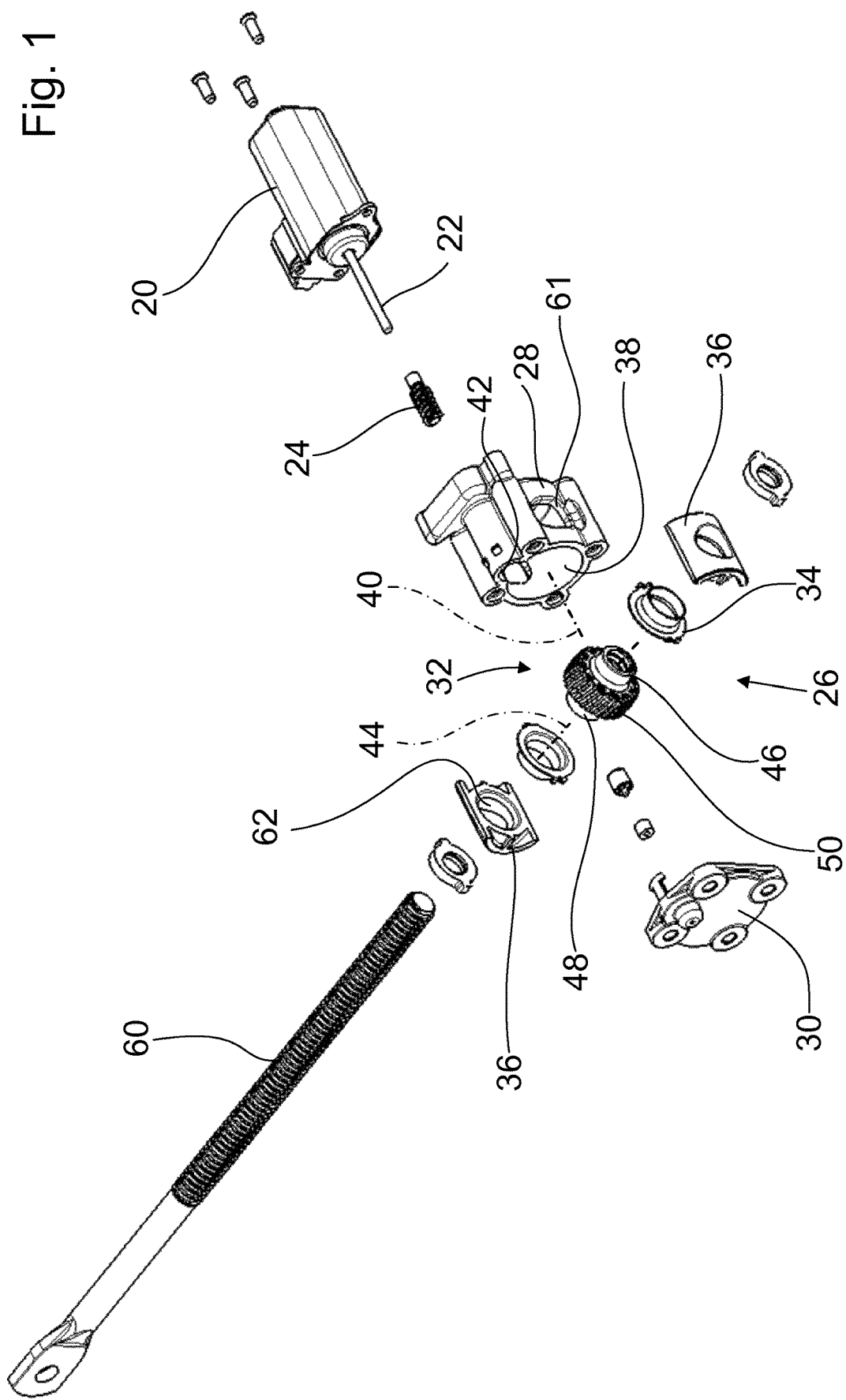
FIG. 1 shows an exploded view of an actuator drive.
Figure 2:
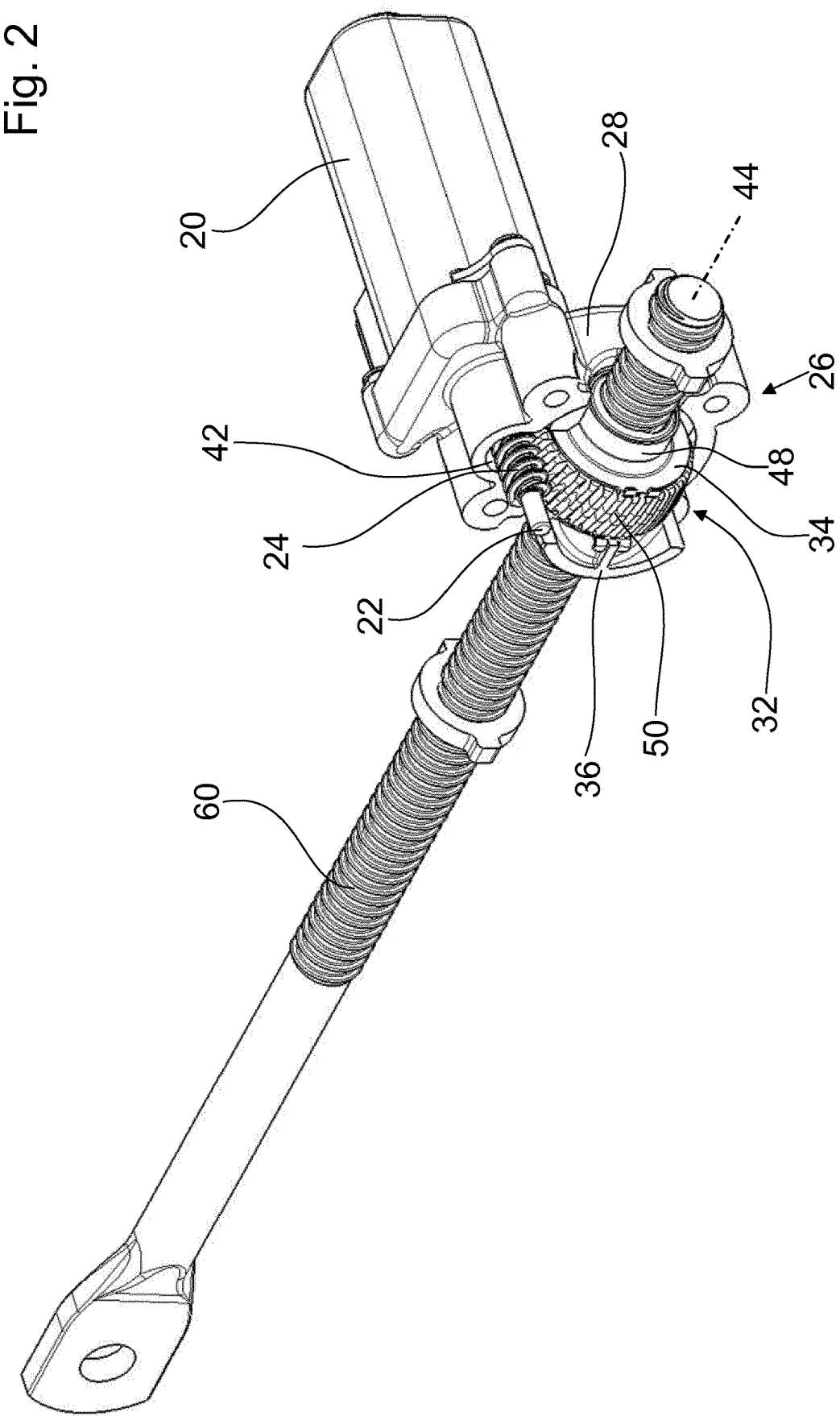
FIG. 2 shows a perspective view of a partially-assembled actuator drive of FIG. 1.
Figure 3:
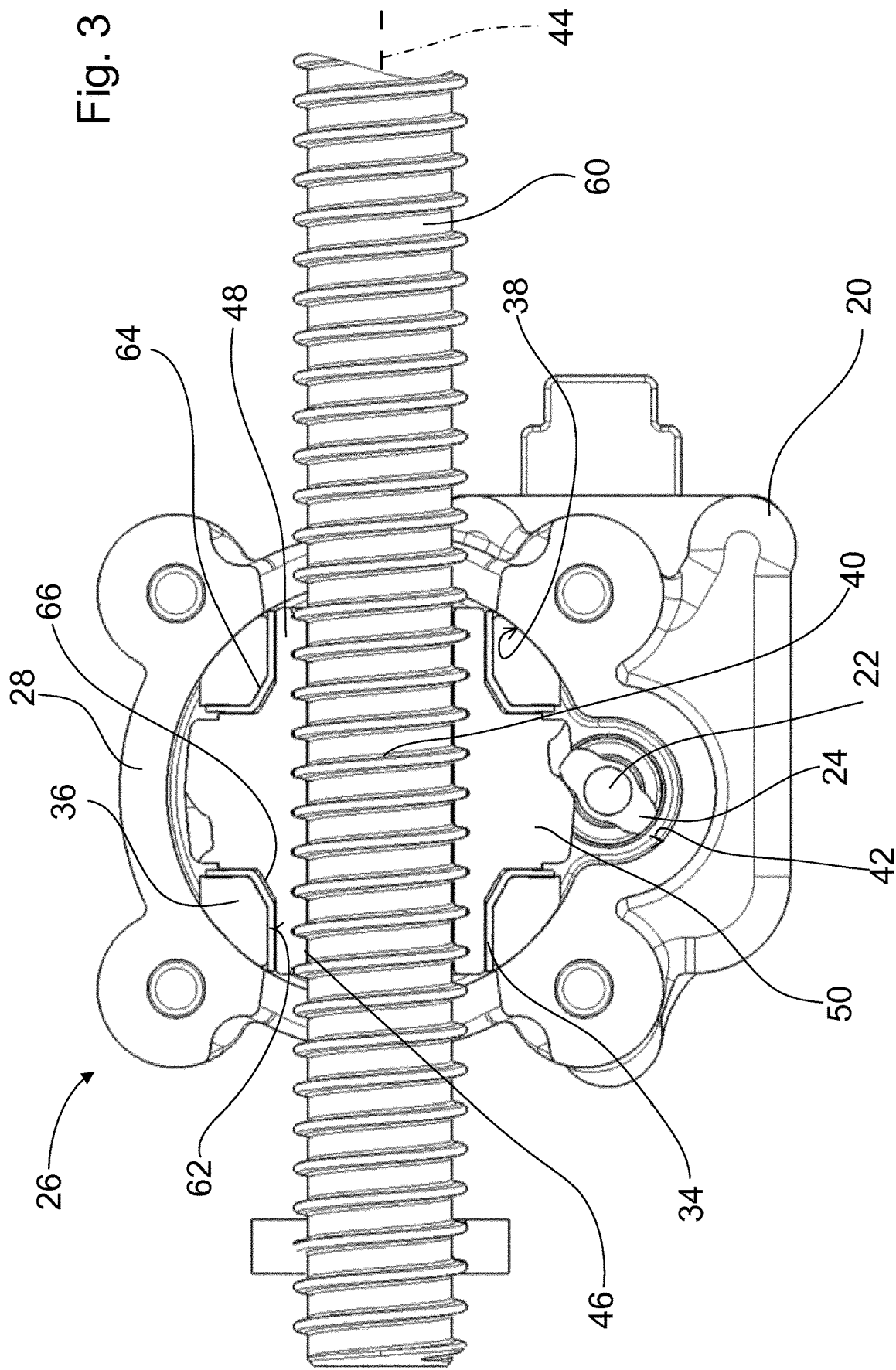
FIG. 3 shows a sectional view with a sectional plane extending transversely to the drive shaft of the actuator drive of FIG. 2.
Figure 6:
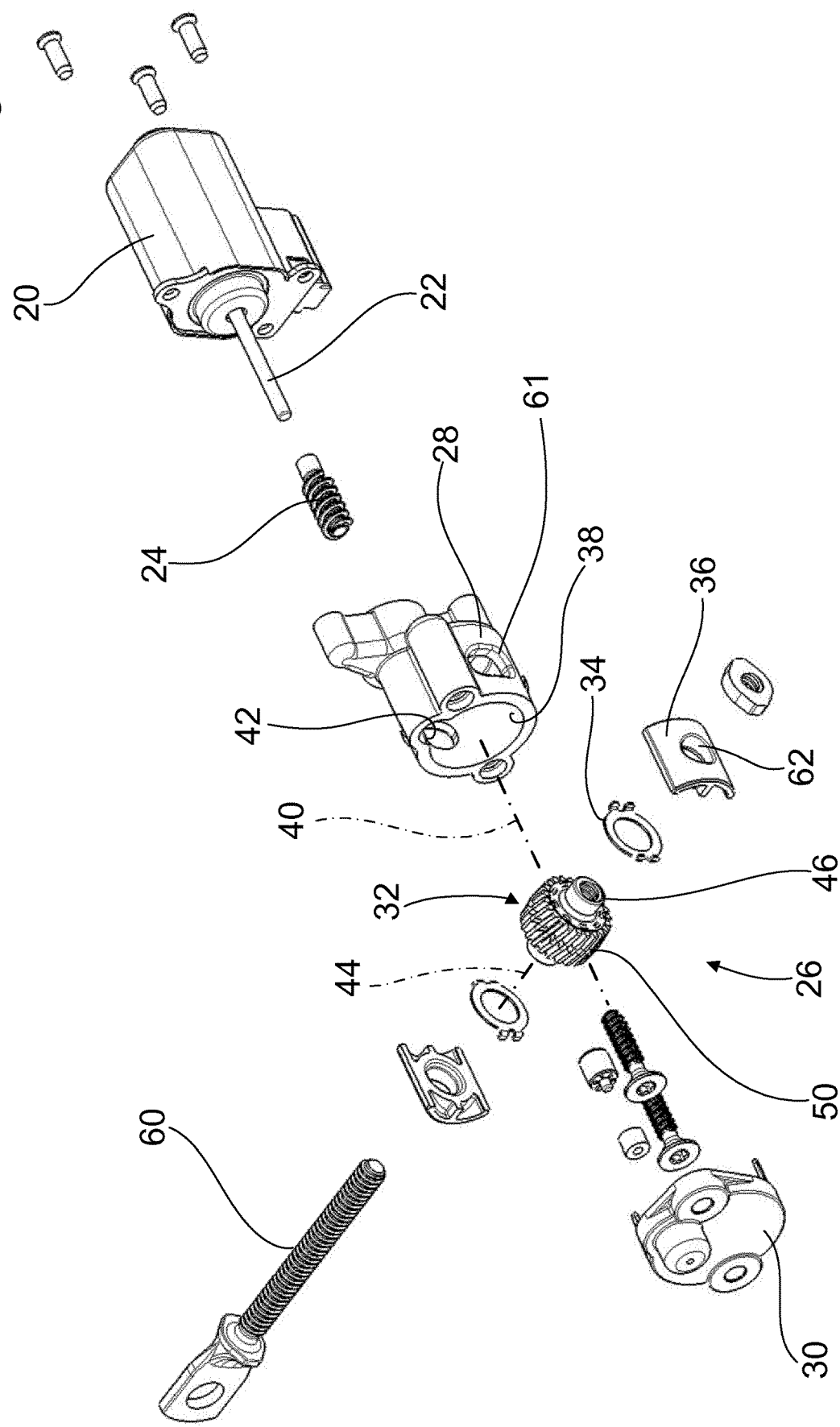
FIG. 6 shows an exploded view of another embodiment of an actuator drive.

In at least some embodiments, the actuating drive has an electric motor 20, which is operatively connected with a drive shaft 22, on which a worm 24 is arranged. The electric motor 20 is connected to a transmission 26 by three fastening means; see FIGS. 1 and 6. This transmission 26 has a housing consisting of a body 28 and a cap 30. It also has a transmission gear 32, two support means 34 and a bearing part consisting of two single bearing shells 36.

In at least some embodiments, the body 28 confines a cylinder bore 38, it has a cylinder axis 40 and is open on one side, this opening is closed by the cap 30 in a detachable manner. The cylinder bore 38 has a clear depth that is in the range of 70-130% of its diameter. The body 28 furthermore has a groove 42 which accommodates most of the worm 24. The groove 42 extends parallel to the cylinder axis 40 and over the entire axial length of the cylinder bore 38. In the cap 30, the worm 24, or a shaft connected to it, is mounted rotatably by means of a bearing; the body 28 has a corresponding opening.

In at least some embodiments, the transmission gear 32 has a rotational axis 44, an internal thread 46 centered to this rotational axis 44, two stub shafts 48 and a worm wheel 50 which is in engagement with the worm 24. The worm wheel 50 is a spherical gear. It has an outer diameter which is in the range of 70-90% of the diameter of the cylinder bore 38.

In at least some embodiments, the body 28, the transmission gear 32 and the bearing shells 36 are made of plastic, which may be a reinforced plastic.

In at least some embodiments, the two bearing shells 36 are identical in design. They can be cylinder segments. They are each within an imagined three-dimensional area 52; see FIGS. 4 and 5. This area has its largest cross-sectional dimension transverse to the cylinder axis 40, as seen at the point where the cylinder axis 40 and the rotational axis 44 intersect. This so-called intersection 54 is located in the geometric center of the transmission gear 32. For further description, a third axis 56 is added, which extends orthogonally to both the cylinder axis 40 and the rotational axis 44, and which with these axes forms an orthogonal coordinate system, which has its center in said intersection 54. The outer diameter of the worm wheel 50 is 70-90% of the dimension of a bearing shell 36, as determined in the direction of the third axis 56. This outer diameter is 80-120% of the dimension of a bearing shell 36, as determined in the direction of the cylinder axis 40.

In at least some embodiments, the two bearing shells 36 protrude the furthest radially outward at the point where the three-dimensional area 52—measured at a right angle with regard to the cylinder axis 40—has its largest cross-sectional dimension. They protrude so far that they bear against the cylinder bore 38. Where they protrude most radially outward, namely in the plane of rotational axis 44 and third axis 56, their extension is confined by a circular line, the radius of which is adapted to the radius of the cylinder bore 38, such that the bearing shells 36 are accommodated in the cylinder bore 38 with a precise fit.

In at least some embodiments, the plane mounted by the rotational axis 44 and the third axis 56 is also referred to as the cross section 58. Seen in the direction of the cylinder axis 40, the diameters of the three-dimensional area 52, determined in planes parallel to this cross section 58, decrease as the distance from the cross section 58 increases. Therefore, at least the diameter determined parallel to the rotational axis 44 decreases correspondingly. In other words, the two bearing shells 36 protrude outwardly to a lesser degree as the distance from the cross section 58, as seen in the direction of the rotational axis 44, increases. As a result, the two bearing shells 36 can be slightly pivoted about the third axis 56. This angle, which lies in the so-called second pivot angular range, is small; the second pivot angular range is no more than ±1.5°. The difference to a straight extension of the three-dimensional area parallel to the cylinder axis 40 and determined in the plane of the cylinder axis 40 and the rotational axis 44 is correspondingly small.

Seen in the plane of the cylinder axis 40 and the third axis 56, it is possible, on the one hand, that the values of the diameter of the three-dimensional area determined in this plane and parallel to the third axis 56 also grow smaller as the distance from the cross section 58 increases, or, on the other hand, it is possible that these values of the diameter remain constant. In the latter, second case, the three-dimensional area 52 continuously bears against the cylinder bore 38; in the first case, the distance between them increases as the distance from the cross section 58 increases, as measured parallel to the third axis 56, as explained above analogously for the diameters determined in planes parallel to the cross section 58 in the direction of the rotational axis 44. In the first case, a compensating movement is also achieved by pivoting about the rotational axis 44. In the second case, this additional compensating movement does not take place.

Figure 4:
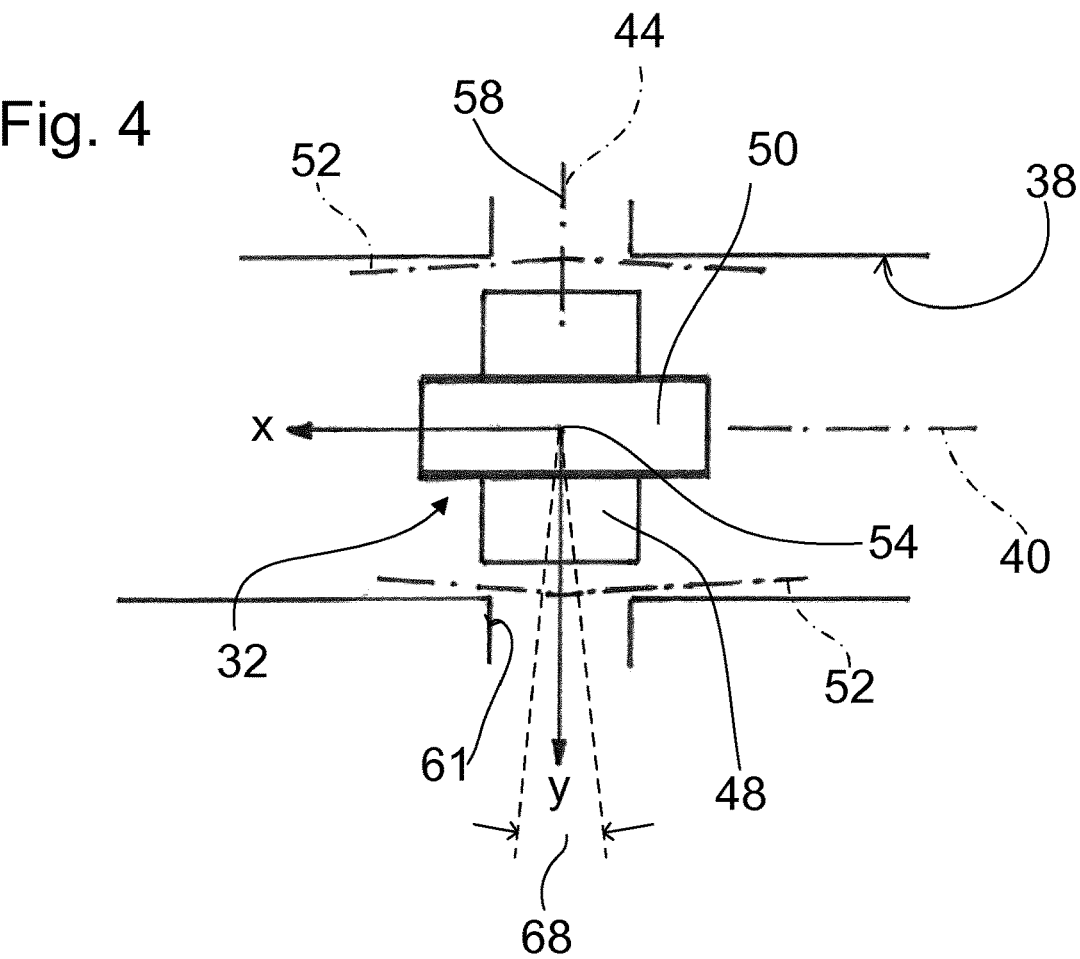
FIG. 4 shows a schematic representation of a cylinder bore and a transmission gear located therein, in a sectional plane which is determined by the rotational axis and the cylinder axis.

The geometrical relationships described above are explained again on the basis of FIGS. 4 and 5. The three-dimensional area 52 is shown in these drawings. In addition, the transmission gear 32 and the cylinder bore 38 with outlets 61 are shown in the drawings for better orientation and understanding. The coordinate system is shown in these drawings. The x-axis is formed by the cylinder axis 40, the y-axis is formed by the rotational axis 44, and the z-axis is the third axis 56. In at least some embodiments, the three-dimensional area 52 confines the bearing parts to the outside. The three-dimensional area 52 has its largest cross-sectional dimension transversely to the cylinder axis 40 as seen at the intersection 54, i.e. in the cross section 58. The three-dimensional area 52 is mirror-symmetrical to this cross section 58, and also to the x-y plane and to the x-z plane. Each bearing shell 36 may be mirror-symmetrical to the x-y plane and to the y-z plane (cross section 58). The second pivot angular range 68 is shown in FIG. 4. The first pivot angular range extends at a right angle to the paper plane of FIG. 4; in the cross section 58, the y-axis is its center. A third pivot angular range can be shown in FIG. 5, according to the representation in FIG. 4. The pivot movement is performed about the y-axis.

Figure 5:
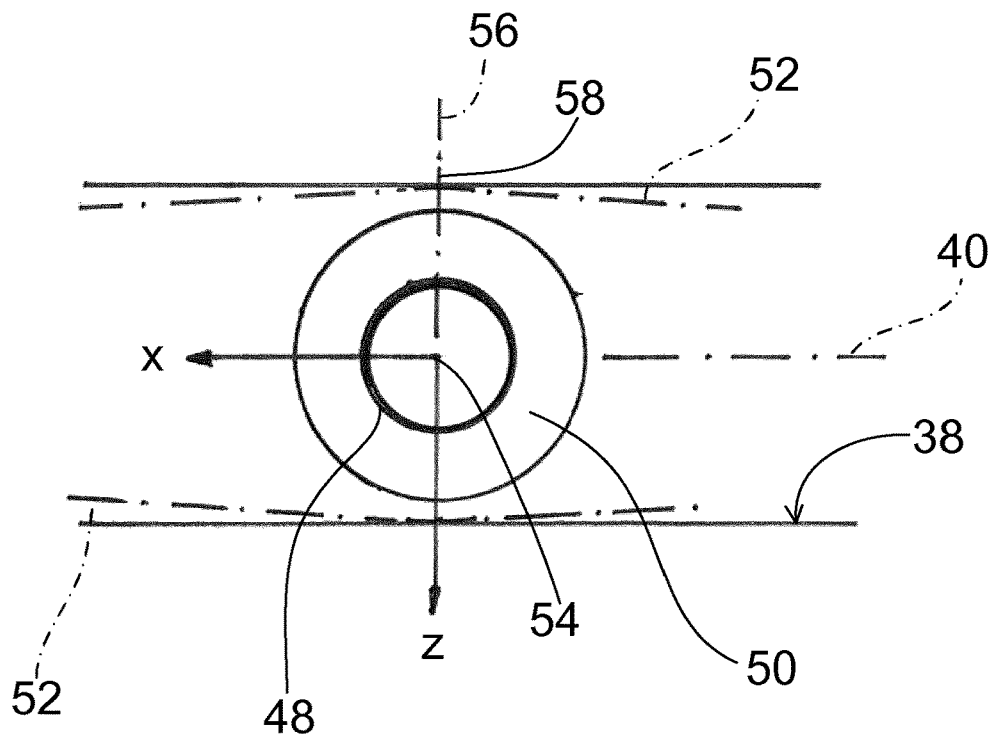
FIG. 5 shows a schematic representation of the cylinder bore and a transmission gear shown in FIG. 4, but now with a sectional plane rotated by 90° about the cylinder axis.

The three-dimensional area 52 may extend differently than shown in FIG. 5, e.g., in such a manner that the dotted line shown here does not diverge from the line of the cylinder bore 38 with increasing distance from the cross section 58, but in each case coincides with the respective lines for the cylinder bore 38. In this case, a compensating movement with a pivot movement about the y-axis is not possible.

In at least some embodiments, the actuating drive has a spindle 60, which has a spindle axis, which coincides with the rotational axis 44. The spindle 60 has an external thread, which is in engagement with the internal thread 46. The spindle 60 extends through the outlets 61, which are formed in the body 28. These are slotted holes, which have a large inner clearance extending peripherally around the cylinder axis 40, and have a small inner clearance extending parallel to the cylinder axis 40; the latter is at least 50% smaller than the large inner clearance. Due to the large inner clearance, the first pivot angular range is limited. The second pivot angular range is determined by the special shape of the bearing shells 36 and/or the dimension of the small inner clearance.

In at least some embodiments, the spindle 60 furthermore extends through the support means 34 and through the transmission gear 32, which is provided with an internal thread 46 throughout. The support means 34 are secured against rotation by protruding tabs. In the second exemplary embodiment, the support means 34 are designed as flat metal washers. The washers are located between a side wall of the worm wheel 50 and the bearing shells 36. In the first exemplary embodiment, the support means 34 have a more complex design; they now are positioned not only between a side wall of the worm wheel 50 and the bearing shells 36, but also between the stub shafts 48 and a bearing opening 62 of the bearing shells 36. In a transition area 64 located in between, the support means 34 extend diagonally to the side wall and to the stub shaft 48. An air gap 66 is located at this transition area 64. It is present between the transition area 64 and an angled shoulder of the transmission gear 32. On the other side of the air gap 66, the support means 34 bears against the adjacent bearing shell 36, which also extends at an angle in this location.

In at least some embodiments, which may include embodiments for a motor vehicle, the actuating drive has a transmission 26, which has a housing, a transmission gear 32 which is in engagement with a drive shaft 22, a bearing part and a rotational axis 44, and a spindle 60 which extends through an internal thread 46 of the transmission gear 32 and outlets 61 of the housing. The housing has a cylinder bore 38 that accommodates the bearing part and defines a cylinder axis 40. The bearing part is confined by a three-dimensional area 52 which, seen in the direction of the cylinder axis 40, has its largest cross-sectional area at a right angle to the cylinder axis 40 at the intersection 54 of the cylinder axis 40 with the rotational axis 44. This largest cross-sectional area is a circular area. With increasing distance from this intersection 54 in both directions of the cylinder axis 40, the size of the cross-sectional area decreases and may no longer be a circular area. The bearing part has two bearing shells 36, each with a bearing opening 62, which is centered to the rotational axis 44, which the spindle 60 penetrates and in which the transmission gear 32 is mounted rotatably.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

Terms as well as specifications are to be understood in such a way that a deviation from the normal or specified value is possible and still within the scope of the invention, which may be ±5%, ±2%, ±1% or some other value as relevant, as one of ordinary skill in the art would understand. The applicant reserves the right to combine any features and sub-features from the claims and/or any features and sub-features from a sentence of the description with other features, sub-features or partial features in any manner, which right may be applied even outside the features of the independent claims.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. An actuating drive comprising:
   an electric motor configured to drive a drive shaft;
   a transmission having a) a housing rigidly connected with the electric motor, b) a transmission gear defining splines that engage with the drive shaft and defining a rotational axis, and c) a bearing part located between the transmission gear and the housing; and
   a spindle defining a spindle axis extending parallel to the rotational axis, wherein the spindle extends through an internal thread of the transmission gear and through outlets in the housing, and is in engagement with the internal thread;
   wherein the housing defines a cylinder bore configured to receive the bearing part and defines a cylinder axis;
   wherein the bearing part defines a three-dimensional area that, viewed in a direction of the cylinder axis, defines a largest cross-sectional area thereof at a right angle to the cylinder axis at an intersection of the cylinder axis with the rotational axis;
   wherein the largest cross-sectional area defines a circular area;
   wherein, with increasing distance from the intersection along the cylinder axis, a size of the cross-sectional area decreases;
   wherein the bearing part defines two bearing shells, each of which defines a bearing opening centered relative to the rotational axis; and
   wherein the spindle penetrates said bearing openings and the transmission gear is mounted rotatably in the bearing openings.

2. An actuating drive according to claim 1, wherein the cylinder axis, the rotational axis and a third axis define an orthogonal coordinate system at the intersection, and, in a plane defined by the cylinder axis and the third axis, a diameter of the three-dimensional area defined in a direction of the third axis remains substantially constant or decreases as a distance from the intersection increases.

3. An actuating device according to claim 2, wherein the diameter decreases with a slope of less than 5°.

4. An actuating drive according to claim 1, wherein the cylinder axis, the rotational axis and a third axis define an orthogonal coordinate system, and, in a plane defined by the cylinder axis and the rotational axis, a size of the three-dimensional area defined in a direction of the rotational axis decreases as a distance from the intersection increases.

5. An actuating device according to claim 4, wherein the size of the three-dimensional area decreases with a slope of less than 5°.

6. An actuating drive according to claim 1, wherein the three-dimensional area is defined by a spheroid, which is defined by a generating ellipse, which (a) defines a first half-axis about which the generating ellipse rotates and which coincides with the cylinder axis, and (b) defines a second half-axis smaller than the first half axis and defining a length i) adapted to a radius of the cylinder bore and ii) is no more than about 20% of a length of the first half-axis.

7. An actuating drive according to claim 1, wherein the bearing shells are identical in shape.

8. An actuating drive according to claim 1, wherein each bearing opening is located below respective outlets of the housing, as viewed in a direction of the rotational axis.

9. An actuating drive according to claim 1, further including at least one support, located between each bearing opening and the transmission gear.

10. An actuating drive according to claim 1, wherein the transmission gear includes two stub shafts, each of which extends in a direction of the rotational axis and is located within a respective one of the bearing openings.

11. An actuating drive according to claim 1, wherein the drive shaft includes a worm, and the transmission gear defines a worm wheel defining the splines, wherein the splines are in engagement with the worm.

12. An actuating device according to claim 11, wherein the worm wheel defines a spherical gear.

13. An actuating drive according to claim 1, wherein the housing includes a body defining the cylinder bore and a cap.

14. An actuating drive according to claim 8, wherein the outlets of the housing define slotted holes defining a first inner clearance extending peripherally about the cylinder axis and a second inner clearance smaller than the first inner clearance and extending substantially parallel to the cylinder axis.

15. An actuating drive according to claim 1, wherein the three-dimensional area is symmetrical with respect to at least one of the following planes:
   a cross section of the three-dimensional area,
   a plane defined by the cylinder axis and the rotational axis, and
   a plane defined by the cylinder axis and the third axis.

16. An actuating device according to claim 15, wherein the three-dimensional area is mirror symmetrical to all of said mirror planes.

17. An actuating drive according to claim 1, wherein each bearing shell defines a cylinder segment shape.

18. An actuating device according to claim 1, wherein the size of the cross-sectional area decreases at a constant rate.

* * * * *